(12) United States Patent
Lin et al.

(10) Patent No.: US 10,949,744 B2
(45) Date of Patent: Mar. 16, 2021

(54) RECURRENT NEURAL NETWORK ARCHITECTURES WHICH PROVIDE TEXT DESCRIBING IMAGES

(71) Applicant: Adobe Inc., San Jose, CA (US)

(72) Inventors: Zhe Lin, Fremont, CA (US); Yufei Wang, La Jolla, CA (US); Scott Cohen, Sunnyvale, CA (US); Xiaohui Shen, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/507,960

(22) Filed: Jul. 10, 2019

(65) Prior Publication Data

US 2019/0332937 A1 Oct. 31, 2019

Related U.S. Application Data

(63) Continuation of application No. 15/456,348, filed on Mar. 10, 2017, now Pat. No. 10,387,776.

(51) Int. Cl.
*G06K 9/00* (2006.01)
*G06N 3/08* (2006.01)
*G06F 16/58* (2019.01)
*G06K 9/46* (2006.01)
*G06K 9/62* (2006.01)
(Continued)

(52) U.S. Cl.
CPC ............ *G06N 3/08* (2013.01); *G06F 16/5866* (2019.01); *G06K 9/4628* (2013.01); *G06K 9/6276* (2013.01); *G06N 3/0445* (2013.01); *G06N 3/0454* (2013.01); *G06F 40/205* (2020.01)

(58) Field of Classification Search
CPC . G06F 16/5866; G06F 40/205; G06K 9/4628; G06K 9/6276; G06N 3/0445; G06N 3/0454; G06N 3/08
See application file for complete search history.

(56) References Cited

U.S. PATENT DOCUMENTS

2009/0161962 A1   6/2009   Gallagher et al.
2015/0054824 A1   2/2015   Jiang
(Continued)

OTHER PUBLICATIONS

Vinyals, et al. "Show and Tell: A Neural Image Caption Generator", Computer Vision and Pattern Recognition, 2015, 9 pages (Year: 2015).*

(Continued)

*Primary Examiner* — Nirav G Patel
(74) *Attorney, Agent, or Firm* — F. Chau & Associates, LLC

(57) ABSTRACT

Provided are systems and techniques that provide an output phrase describing an image. An example method includes creating, with a convolutional neural network, feature maps describing image features in locations in the image. The method also includes providing a skeletal phrase for the image by processing the feature maps with a first long short-term memory (LSTM) neural network trained based on a first set of ground truth phrases which exclude attribute words. Then, attribute words are provided by processing the skeletal phrase and the feature maps with a second LSTM neural network trained based on a second set of ground truth phrases including words for attributes. Then, the method combines the skeletal phrase and the attribute words to form the output phrase.

19 Claims, 6 Drawing Sheets

(51) Int. Cl.
  *G06N 3/04*    (2006.01)
  *G06F 40/205*  (2020.01)

(56) References Cited

U.S. PATENT DOCUMENTS

2018/0046912 A1\* 2/2018 Kurata ................. G06N 3/0454
2018/0144248 A1\* 5/2018 Lu ......................... G06K 9/481

OTHER PUBLICATIONS

Xu, et al. "Show, Attend and Tell: Neural Image Caption Generation with Visual Attention", Proceedings of the 32nd International Conference on Machine Learning, Lille, France, 2015. JMRL:W&CP vol. 37. 10 pages. (Year: 2015).\*
Venugopalan, Subhashini, et al. "Sequence to sequence-video to text." Proceedings of the IEEE international conference on computer vision. 2015. (Year: 2015).\*
U.S. Appl. No. 15/456,348, filed Mar. 10, 2017.
Vinyals, et al., "Show and Tell: A Neural Image Caption Generator", Computer Vision and Pattern Recognition, 2015, arXiv:1411.4555v2, 9 pages.
Xu, et al., "Show, Attend and Tell: Neural Image Caption Generation with Visual Attention", Proceedings of the 32nd International Conference on Machine Learning, Lille, France, 2015. JMLR: W&CP vol. 37. Copyright 2015 by the author(s). In arXiv preprint arXiv:1502.03044, 2015, 10 pages.

\* cited by examiner

RECURRENT NEURAL NETWORK ARCHITECTURES WHICH PROVIDE TEXT DESCRIBING IMAGES

CROSS-REFERENCE TO RELATED APPLICATION

This application is a continuation application and claims the benefit of U.S. application Ser. No. 15/456,348, filed on Mar. 10, 2017 and titled "RECURRENT NEURAL NETWORK ARCHITECTURES WHICH PROVIDE TEXT DESCRIBING IMAGES", all of which is incorporated herein by reference in its entirety.

TECHNICAL FIELD

This disclosure relates generally to systems and techniques used to process images, and more particularly relates to providing text describing an image.

BACKGROUND

In image processing and use, it is often desirable to create a caption describing an image. A caption is a phrase that describes the content of an image. For example, a caption that says "business people sitting around a large conference table" may describe an image of that content. Captions can identify the objects in an image, relationships amongst the objects, and provide other details about the image. Captions can also draw attention to certain image features which otherwise may be overlooked, and can be used to categorize the image for filing and subsequent retrieval. It is very time-consuming to manually caption a large number of digital images. Manual captioning also is influenced by human error, which leads to captioning errors.

Computerized techniques have been used to caption images. However, conventional computerized techniques often produce captions that are not sufficiently accurate (e.g., a group of bullets laying side-by-side is described by a conventional computerized technique as a pack of cigarettes), produce captions which are too long, produce captions that are unnaturally composed (e.g., "a teddy bear sitting on a chair with a stuffed animal," "a street sign with a street sign on it"), or a combination thereof. Conventional computerized techniques also often fail to describe objects which would interest a human viewing the image, and mistakenly align attributes with the wrong object. For example, in an image in which a tennis player's shorts are white, the automatically-generated caption may indicate that the shorts are black.

SUMMARY

Systems and techniques are disclosed that provide an output phrase describing an image. In an example, a method includes creating feature maps describing image features in locations in the image. The feature maps are created by processing the image with a convolutional neural network which is trained to extract the image features based on color values of pixels within the locations. The method also includes providing a skeletal phrase for the image. The skeletal phrase is provided by processing the feature maps with a first long short-term memory (LSTM) neural network. The first LSTM neural network is trained to determine the skeletal phrase based on a first set of ground truth phrases including words describing objects and relationships of the objects in a first set of ground truth images, without including words describing attributes. Then, the method provides attribute words describing objects in the image. The attribute words are provided by processing the skeletal phrase and the feature maps with a second LSTM neural network. The second LSTM neural network is trained to determine the attribute words based on a second set of ground truth phrases including words describing attributes of objects in a second set of ground truth images. After providing the skeletal phrase and the attribute words, the method combines the skeletal phrase and the attribute words to form the output phrase.

These illustrative features are mentioned not to limit or define the disclosure, but to provide examples to aid understanding thereof. Additional embodiments are discussed in the Detailed Description, and further description is provided there.

BRIEF DESCRIPTION OF THE DRAWINGS

The accompanying drawings, which are included to provide a further understanding of the disclosed subject matter, are incorporated in, and constitute a part of, this specification. The drawings also illustrate examples of the disclosed subject matter, and together with the detailed description, serve to explain the principles of examples of the disclosed subject matter.

DETAILED DESCRIPTION

Figure 1:
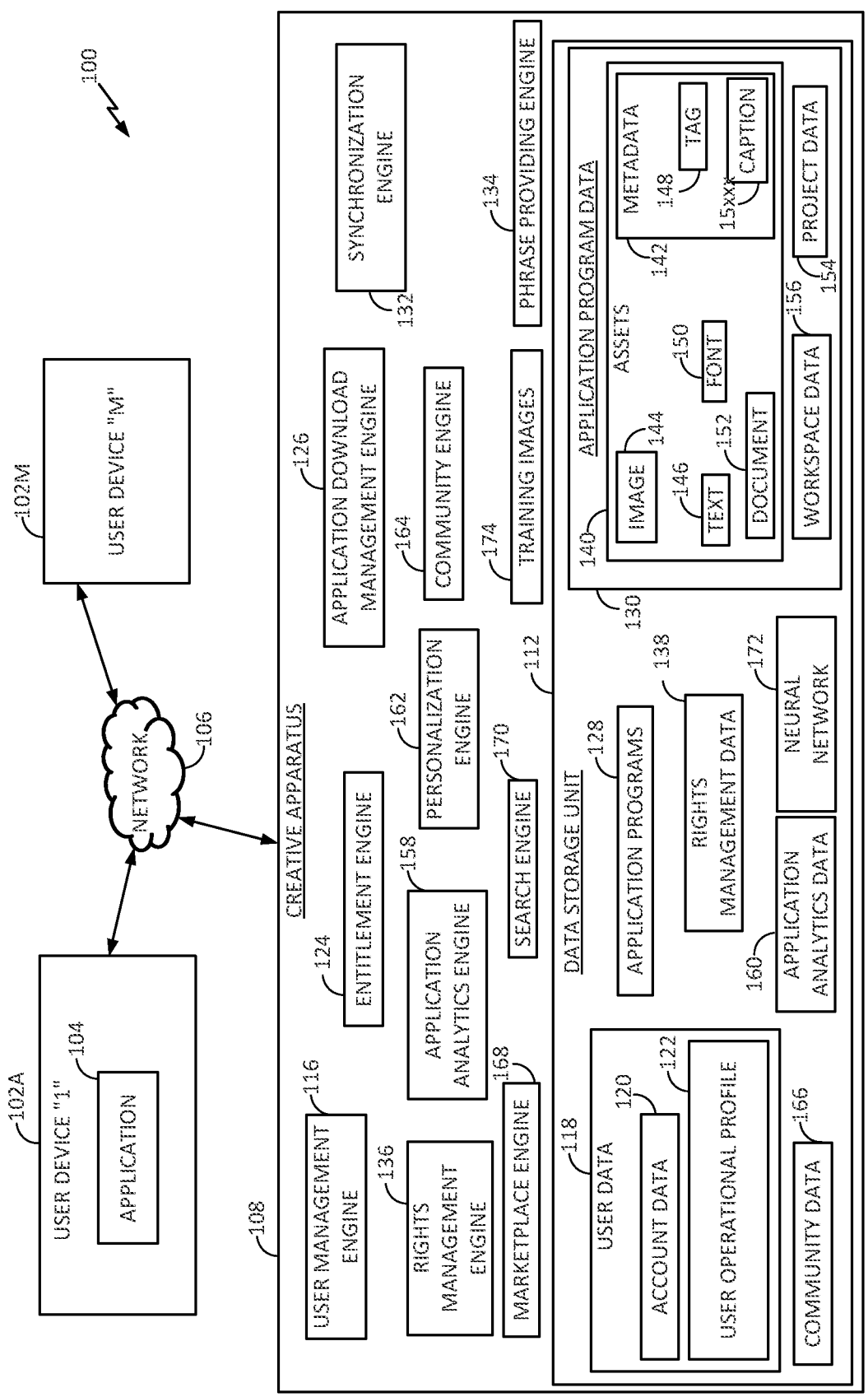
FIG. 1 is a diagram of an environment in which one or more techniques of the invention can be practiced.

The techniques disclosed herein use neural networks to automatically generate a text phrase (e.g., a title, a caption, or the like) which can summarize an image's content and is specific, natural, and compact. Examples of text phrases which meet these criteria are "Eiffel Tower at night," "young creative business people," "boy playing soccer," "yellow flower on white background," etc.

The techniques disclosed herein have many applications, such as automatically suggesting a description of a user-uploaded photo, generating auxiliary bigram-tag to enable a high-quality search, removing tag noise, enabling phrase-based image retrieval, enabling natural language-driven image editing, enabling document image-voice over features, optimizing tag relevance for searches, enabling visual question answering, improving robot interaction, improving an experience of human-computer interaction, the like, etc.

Provided are several techniques for automatically providing phrases. Examples of the techniques use a Convolutional Neural Network (CNN) and a Long Short-Term Memory (LSTM). The CNN extracts image features from image data and provides image feature data to the LSTM. The LSTM processes the image feature data and generates, word-by-word, a phrase describing the image's features. The following paragraphs provide a general introduction—additional details are provided in reference to the figures.

A first technique implements a hierarchical LSTM architecture to provide the phrases in a two-stage manner using a first LSTM and a second LSTM. The first LSTM provides a skeletal phrase describing an object and object's relationships with other objects, without describing attributes of the object. In examples, words describing attributes of the object can include adjectives, adverbs, or both. Attributes can describe additional details about the object beyond those described by words in the skeletal phrase.

The second LSTM then provides the attributes describing details of the object. This is different from the conventional techniques, which use a single LSTM to generate the phrase word-by-word without considering if a word describes an object or describes an attribute. Using a two-stage phrase determination technique that implements differently-trained LSTMs provides results that are more accurate than the prior techniques.

In the first technique, image data representing an image is input to a CNN, which extracts image features (e.g., data describing objects) from the image data. The CNN is trained to extract the image features based on pixel values (e.g., color, grayscale value) of pixels within locations of the image. The CNN produces a feature map from the extracted image features. The feature map is input to the first LSTM.

The first LSTM analyzes the feature maps for objects and relationships between the objects, and provides skeletal words which combine to form a skeletal phrase. The first LSTM determines the skeletal phrase based on training with a first set of ground truth phrases. The first set of ground truth phrases includes words describing image features in a first set of ground truth images and relationships of the image features in the first set of ground truth images. Importantly, the first set of ground truth phrases does not include words describing attributes of image features in the first set of ground truth images. In this way, the first LSTM is trained to receive the image data as input and provide a skeletal phrase that describes the objects and relationships of objects in the image, without describing the attributes of the object. As a non-limiting example, a skeletal phrase states "bank with bowtie."

The first LSTM can also provide, based on training, a respective attention for each image feature, and can generate an attention map associating skeletal words with respective locations of image features. The attention map can be refined, after providing the skeletal words, by weighting data in the attention map based on a quantity of attention a person would pay to image features described by a respective skeletal word. The attention map can be used by the second LSTM to improve results.

The second LSTM provides, for each word in the skeletal phrase, associated attributes which further describe the respective skeletal word. The inputs to the second LSTM can include the feature maps and information from the first LSTM, such as the skeletal words, hidden states of the first LSTM that identify potential skeletal words, and/or attention maps that identify the portions of the image having a high probability of having a significant feature. The second LSTM can be trained to determine the attribute words based on a second set of ground truth phrases comprising words describing attributes in a second set of ground truth images. In an example, the second set of ground truth images is the first set of ground truth images. Continuing with the example above, an attribute of the bank can include "piggy," and an attribute of the bowtie can include "black."

Finally, the skeletal words in the skeletal phrase and their respective attributes are merged to form an output phrase. Continuing with the example above, merging the skeletal words with their respective attributes yields an output phrase of "piggy bank with a black bowtie."

A second technique implements a coarse-to-fine LSTM architecture which has two LSTMs. As in the first technique, image data representing an image is input to a CNN, which produces feature maps from extracted image features. The feature maps are input to a first LSTM which is configured as in the first technique. The first LSTM analyzes the feature maps for objects and relationships between the objects, and provides a skeletal phrase describing the objects and relationships between the objects in the image. In a non-limiting example, the skeletal phrase may include "woman holding scale and apple."

A second LSTM provides the output phrase as a whole, rather than providing attributes for each skeletal word separately, as in the first technique. In other words, the second LSTM provides both skeletal words and attributes detailing respective skeletal words. The inputs to the second LSTM can include the feature maps and information from the first LSTM such as the hidden states of the first LSTM that identify potential skeletal words, and the skeletal phrase. The skeletal phrase serves as a soft constraint to encourage the skeletal phrase to appear in the output phrase. These inputs guide the second LSTM to produce an accurate output phrase. The second LSTM can be trained to determine the attribute words based on the second set of ground truth phrases. The second set of ground truth phrases includes words describing attributes of a second set of ground truth images. Continuing with the example above, the second LSTM produces an output phrase of "smiling young woman holding a weight scale and a red apple," which includes the skeletal phrase.

A third technique can be used with an LSTM which uses an attention map as an input to providing a word in an output phrase. The third technique refines the attention map after a word is provided, and prior to providing a subsequent word. An "attention map" is a probability map which is a matrix of probability values which identify the portions of the image having a high probability of having a feature. Using the attention map can assist in identifying relevant portions of the image in the phrase providing process. For example, as the LSTM provides words for a phrase using feature maps provided by a CNN, the LSTM uses the attention map that identifies the portions of the image associated with one or more particular features of the image. After providing the word, this attention map is associated with the provided word, effectively identifying the portions of the image to which the provided word corresponds. When the LSTM provides the next word in the phrase, that providing is based on the previously provided word and the attention map identifying the portions of the image associated with the previously provided word. Rather than simply using the attention map from the feature maps provided by the CNN, the third technique refines the attention map after a word is provided and prior to providing a subsequent word. The refining is based on a word probability map that identifies, for each location in the image, the probability of the word corresponding to the location. Among other benefits, refining the attention map during the providing process provides improves the skeletal phrase provided by the first LSTM and/or provides input that is better aligned with the image to a second LSTM that is used to provide attributes for the skeletal words. The third technique better controls providing words by focusing word providing on visual elements of the image, and can more accurately provide the words for a phrase that describes the image.

A fourth technique uses image-to-text embedding in a phrase-providing process. Image-to-text embedding modifies a CNN to produce feature maps that better represent the features of the image, thus improving accuracy of a provided phrase. In this technique, user-provided image tag data is retrieved from input image data. The tag data is likely to accurately identify at least one feature in the image, and thus can be accounted for by the CNN in determining features. The tag data for each tag is represented with data describing a respective pointwise mutual information word vector. Then, using the data describing each of the respective pointwise mutual information word vectors and data describing a respective weight for each tag, data describing a weighted average of the pointwise mutual information word vectors is calculated. The CNN uses the weighted average of the pointwise mutual information word vectors to guide later time-step layers toward specific high-level image features, and thus create a feature map including the high level features.

These techniques, as well as other techniques described herein can be implemented, as is practicable, individually or in combination to form different systems for providing text phrases such as titles, captions, and the like, which best describe images in a specific, compact, and natural way. In examples, the provided technical solutions address and improve upon the technical problems of the conventional techniques, and also provide several beneficial advantages. The provided technical solutions can beneficially and advantageously produce descriptive text phrases which are more accurate, not excessively long, and are composed in a manner which is not stilted. The provided technical solutions can beneficially and advantageously produce descriptive text phrases having improved specificity. Further, in examples, the provided technical solutions can also improve the accuracy of description of objects in an image, accuracy of attributes of the described objects, and accuracy of the attributes with the described objects. The provided technical solutions can also identify and describe objects, in an image, which would interest a human viewing the image. The advantages also include controlling a length of an output phrase without requiring retraining a neural network. Thus, the provided methods and apparatuses can advantageously and beneficially improve on conventional techniques, and can improve functioning of a machine which is configured to provide an output phrase describing an image.

Terminology

The following examples of terminology are provided to assist in comprehending the current disclosure, and are not provided as limitations.

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the term "image" refers to data representing an appearance. Images can represent solid colors, patterns, real objects, artificial objects, scenes, and numerous other things. Images can be captured using cameras and other image capture devices, generated by computers, created by artists and other users, and created in various other ways. Images can be, but are not necessarily, composed of pixels arranged in a rectangular array with a certain height and width. Each pixel can consist of one or more bits of information, representing the brightness of the image and/or the color of the image at that point.

As used herein, the acronym "CNN" refers to a Convolutional Neural Network. A CNN is a type of feed-forward neural network which can process and collect portions of an input image. The CNN can overlap and process the portions to identify regions of the image which may include salient image features. The CNN thus can output "feature maps" identifying the existence and respective location of salient features in an input image.

As used herein, the phrase "feature map" refers to a vector describing semantic content of an image on a very coarse grid, such as, in a non-limiting example, a seven pixel-by-seven pixel portion of a larger image. The feature map enables focusing attention of subsequent LSTM processing on the portion of the image (instead of the entire image), and thus enables providing more a accurate description of image features present in the portion.

As used herein, the acronym "LSTM" refers to a Long Short-Term Memory neural network. An LSTM is a type of recurrent feed-forward neural network architecture which can be trained to classify input data, such as to identify a word describing feature data. An LSTM is trained on a training data set, such as a training data set having images and known-accurate respective phrases describing each of the images. Thus, the LSTM can receive input feature data and provide words which describe, with a high level of probability, the salient features of the input feature data. The LSTM includes intermediate hidden layers of processing units which perform a function on data input from a preceding layer. The output from a hidden layer is a "hidden state." The hidden state is "hidden" in the sense that the hidden state is not an output from an output layer. The hidden state can provide useful data which identifies a relationship between words describing objects in an image. Hidden state attributes can differ depending on a location of a word in a phrase (i.e., context), and thus can provide information about composing at least a portion of a skeletal sentence.

As used herein, the phrase "attention map" refers to a probability map which is a matrix of probability values (also known as weights). Locations in the attention map correspond with locations in the image. The individual probability values in each location in the attention map indicate an importance of their respective location relative to the other locations. Thus, an attention map can identify portions of an image having a high probability of having a significant feature. An attention map can be used to weight a feature map, and thus identify a portion of an image which is most relevant to a skeletal word. In an example, an attention map can be used as an input to an attribute providing process to assist identifying an attribute describing a skeletal word by identifying the most relevant portions of the image relating to the skeletal word.

For example, if an image includes a man walking a dog, then data indicating the dog may only be in a few cells (i.e., image portions). For those cells indicating the dog, the attention map may be close to "1", while the attention map is closer to "0" for the other cells. Thus, when the attention map is applied and feature vectors are combined, the cells having a significant weight are the cells indicating the dog. Thus, a resultant feature vector input to an LSTM at least mostly describes information about the dog, thus enabling the LSTM to focus on determining attributes about the dog.

A "digital tool," as described herein, includes a tool that is used for performing a function or a workflow electronically. Examples of the digital tool include, but are not limited to, a content creation tool, a content editing tool, a content publishing tool, a content tracking tool, a content managing tool, a content printing tool, a content consumption tool, any combination of these tools, or any other tool that can be used for creating, editing, managing, generating, tracking, consuming or performing any other function or workflow related to content. Digital tools include the creative apparatus 108.

A "digital experience," as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

"Content," as described herein, includes electronic content. Examples of the content include, but are not limited to, image, video, web site, webpage, user interface, menu item, tool menu, magazine, slideshow, animation, social post, comment, blog, data feed, audio, advertisement, vector graphic, bitmap, document, any combination of one or more content, or any other electronic content.

Exemplary Computing Environment

FIG. 1 is a diagram of an environment 100 in which one or more embodiments of the present disclosure can be practiced. The environment 100 includes a creative apparatus that supports various creative functions performed by users using one or more user devices, such as a user device 102A up to a user device 102M. The creative functions, for example, can include providing an output phrase describing an image. In another example, the creative functions can enable users to view, create, and/or edit electronic content. Each of the user devices 102A-M can be configured to execute an application 104 to perform at least a portion of a method described herein.

Each of the user devices is connected to a creative apparatus 108 via a network 106. Users of the user devices 102A-102M use various products, applications, or services supported by the creative apparatus 108 via the network 106. The user devices 102A-102M can correspond to various users. Examples of the users include, but are not limited to, creative professionals or hobbyists who use creative tools to generate, edit, track, or manage creative content, end users, administrators, users who use document tools to create, edit, track, or manage documents, advertisers, publishers, developers, content owners, content managers, content creators, content viewers, content consumers, designers, editors, any combination of these users, or any other user who uses digital tools to create, view, edit, track, or manage digital experiences.

Examples of the user devices 102A-M include, but are not limited to, a personal computer (PC), a tablet computer, a desktop computer, a processing unit, any combination of these devices, or any other suitable device having one or more processors. Each user device 102A-102M can include at least one application supported by the creative apparatus 108.

It is to be appreciated that following description is now explained using the user device 102A as an example and any other user device can be used.

Examples of the network 106 include, but are not limited to, the Internet, a local area network (LAN), a wireless area network, a wired area network, a wide area network, the like, or a combination thereof.

The creative apparatus 108 includes one or more engines for providing one or more digital experiences to the user. The creative apparatus 108 can be implemented using one or more servers, one or more platforms with corresponding application programming interfaces, cloud infrastructure, the like, or a combination thereof. In addition, each engine can also be implemented using one or more servers, one or more platforms with corresponding application programming interfaces, cloud infrastructure, the like, or a combination thereof. The creative apparatus 108 also includes a data storage unit 112. The data storage unit 112 can be implemented as one or more databases or one or more data servers. The data storage unit 112 includes data that is used by the engines of the creative apparatus 108. The creative apparatus 108 is an example of a digital tool.

A user of the user device 102A can visit a webpage or an application store to explore applications supported by the creative apparatus 108. The creative apparatus 108 provides the applications as a software as a service (SaaS), or as a standalone application that can be installed on the user device 102A, or as a combination. The user can create an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription accounts and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on a product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user—i.e., free, trial, student, discounted, or paid.

The user then installs various applications supported by the creative apparatus 108 via an application download management engine 126. Application installers or application programs 128 present in the data storage unit 112 are fetched by the application download management engine 126 and made available to the user directly or via the application manager. In one embodiment, application programs 128 are fetched and provided to the user via an interface of the application manager. In another embodiment, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide login details. A check is again made by the user management engine 116 and the entitlement engine 124 to ensure that the user is entitled to use the application program. In another embodiment, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects or the assets are then stored as application program data 130 in the data storage unit 112 by a synchronization engine 132. The synchronization engine 132 also includes a font engine 134 for synchronizing or storing fonts 150 included as part of the application program data 130. The application program data 130 can be specific to the user or can be shared with other users based on rights management. The rights management is performed by a rights management engine 136. Rights management rules or criteria are stored as rights management data 138 in the data storage unit 112.

The application program data 130 includes one or more assets 140. The assets 140 can be a shared asset which the user wants to share with other users or which the user wants to offer on a marketplace. The assets 140 can also be shared across multiple application programs 128. Examples of the assets 140 include, but are not limited to, font, color, size, shape, coordinate, a combination of any of these, and the like. In addition, in one embodiment, each asset 140 also includes a file. Examples of the file include, but are not limited to, an image 144, text 146, a font 150, a document 152, the like, or a combination thereof. The image 144 can be associated with a caption produced by a phrase providing engine 134.

The assets 140 can include metadata 142 describing the image 144. The metadata 142 can include data describing a tag 148, a caption 176, or a combination thereof. For example, the phrase providing engine 134 can use one or more neural networks 172 to provide a caption describing the image 144. In one example the neural networks 172 are trained using training images 174 to produce a caption.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in another embodiment.

In some embodiments, the user interaction with the application programs 128 is also tracked by an application analytics engine 158 and stored as application analytics data 160. The application analytics data 160 includes, for example, usage data describing usage of a tool, usage of a feature, usage of a workflow, usage of the assets 140, the like, or a combination thereof. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" a maximum number of times. The output of the application analytics engine 158 is used by a personalization engine 162 to personalize the tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of a project of the user. For example, if the user was preparing an article in a digital publishing application and, at the time the user quit the digital publishing application, still needs to publish the prepared article, the application analytics engine 158 tracks the state. When the user next opens the digital publishing application on another device, then the state is indicated to the user, and options are provided to the user for publishing using the digital publishing application or any other application.

The creative apparatus 108 also includes a community engine 164 which enables creation of various communities and collaboration among the communities. A community, as described herein, includes a group of users that share at least one common interest. The community can be closed (i.e. limited to a number of users), or can be open (i.e. anyone can participate). The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 can provide collaborative workflows to the user. For example, the user can create an image and can request for some expert opinion or expert editing. An expert user can then either edit the image as per the user liking or can provide expert opinion. In collaborative workflows, each of a plurality of users is assigned different tasks related to the work.

The creative apparatus 108 also includes a marketplace engine 168 for providing a marketplace to one or more users. The marketplace engine 168 enables the user to offer an asset for sale or use. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

It is to be appreciated that the engines and working of the engines are described as examples herein and the engines can be used for performing any step in providing a digital experience to the user.

Embodiments of the invention provide techniques, systems, and computer-readable mediums with stored instructions that enable providing a caption of an image. The functions involved in these embodiments of the invention generally involve producing a phrase describing an image. These functions are generally implemented on one or more computing devices that use one or more processors to execute algorithms of one or more operations defined in stored instructions. The computing devices that perform these functions can be located on a user's local computing device, such as on the user device 102A, or on a remote computing device, such as on creative apparatus 108 of FIG. 1. The operations of various exemplary algorithms that can be employed to perform these functions are discussed throughout this specification.

Exemplary Techniques for Providing an Output Phrase Describing an Image

I. Hierarchical LSTM Technique

Figure 2:
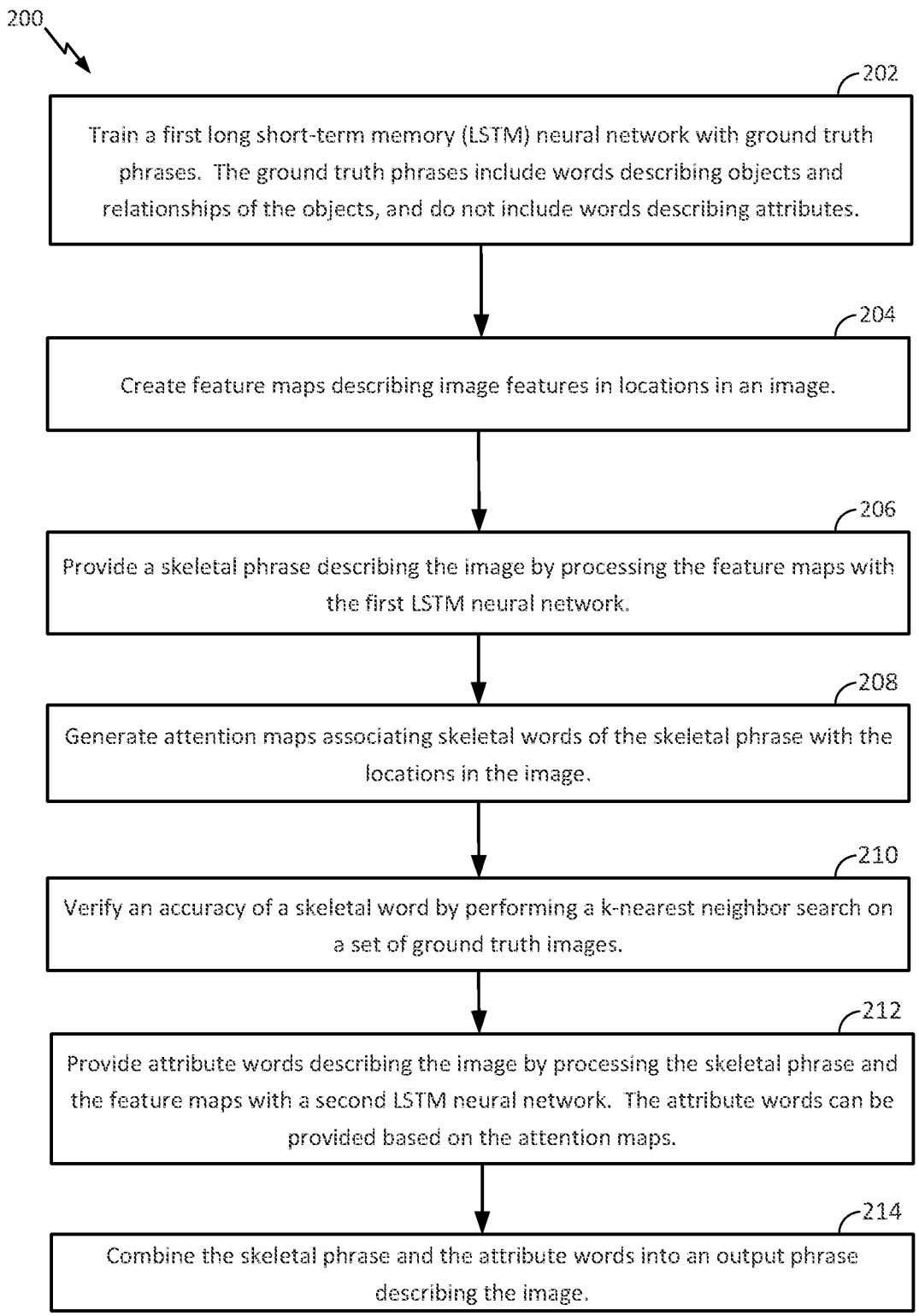
FIG. 2 is a flow chart illustrating an exemplary technique for providing an output phrase describing an image using a hierarchical LSTM architecture.

FIG. 2 is a flow chart illustrating an exemplary technique 200 for providing an output phrase describing an image. The exemplary technique 200 implements a hierarchical LSTM architecture to provide the phrases in a two-stage manner using a first LSTM and a second LSTM. This technique is based on the concept that when a person describes an image, they initially find the important objects in the image and a relationship between the objects. The person then describes the important objects and attributes of the important objects. It is beneficial to implement a neural network in a similar manner to provide an output phrase which better matches a description that a human would provide.

The exemplary technique 200 can be implemented by user device 102A and/or creative apparatus 108, although other devices and configurations can also be implemented. The exemplary technique 200 can be implemented by storing and executing instructions in a non-transitory computer-readable medium. Reference to the technique 200 being performed by a computing device includes the technique 200 being performed by one or more computing devices.

In block 202, a first long short-term memory (LSTM) neural network is trained. The training can include: (1) parsing, using a natural language parser, original ground truth phrases describing a set of ground truth images to identify attribute words; and (2) creating a first set of ground truth phrases from the original ground truth phrases by removing the attribute words from the original ground truth phrases. The first set of ground truth phrases includes words describing objects and relationships of the objects in the set of ground truth images, without including words describing attributes.

Figure 3:
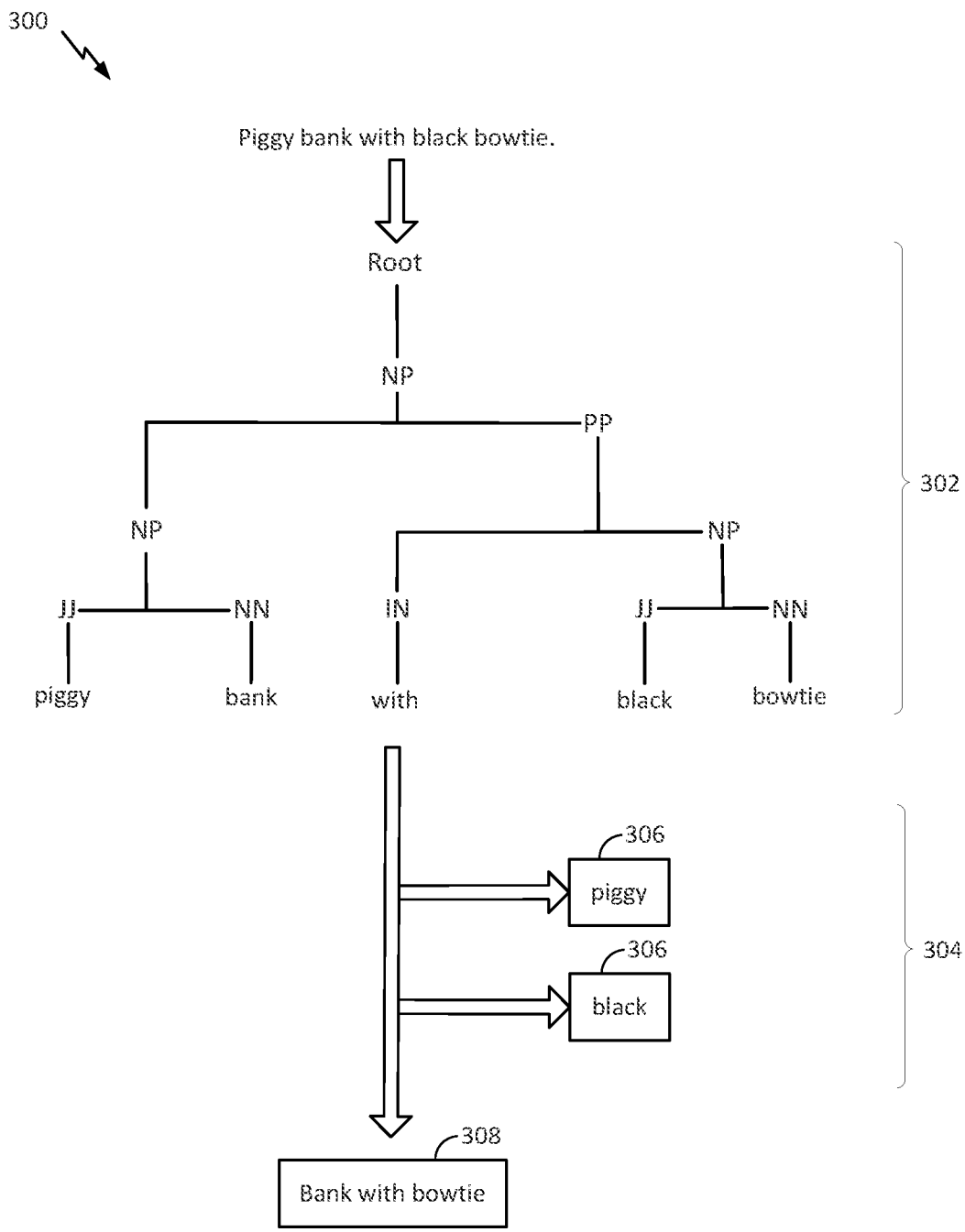
FIG. 3 depicts an example training process.

The training in block 202 can include an example training process 300 depicted in FIG. 3.

FIG. 3 depicts the example training process 300 including parsing 302 an original ground truth phrase. The parsing can be performed by a natural language parser which is configured to analyze each word in an original ground truth phrase and assign a respective part of speech (POS) tag, a chunk tag, a relation tag, or the like to each word. In an example, the POS tag can be a Penn Treebank POS Tag. For example, a common noun can be assigned a POS tag of "NN", a proper noun can be assigned a POS tag of "NP", an adjective can be assigned a POS tag of "JJ", a preposition can be assigned a POS tag of "IN", a bare verb can be assigned a POS tag of "VB", an adverb can be assigned a POS tag of "RB," a prepositional phrase can be assigned a POS tag of "PP", a noun phrase can be assigned a POS tag of "NP", etc.

The training process 300 also includes removing 304 attribute words 306 to create a first ground truth phrase 308.

The attribute words 306 can be identified by their respective POS tags and removed. As an example, an original ground truth phrase of "piggy bank with black bowtie" can be parsed and attribute words (e.g., adjectives having a POS tag of "JJ") such as "piggy" and "black" can be removed to create a first ground truth phrase of "bank with bowtie." The words and POS tags in FIG. 3 are examples, and are not limiting.

Returning to FIG. 2, in block 204, given a trained CNN, the CNN can process an input image to identify feature maps describing image features in locations in the image. The feature maps are created by processing the image with a convolutional neural network (CNN) which is trained to extract the image features (e.g., data describing objects) based on pixel values (e.g., color, grayscale value) of pixels within locations of the image. The CNN produces feature maps from the extracted image features. The feature maps are input to the first LSTM.

In block 206, a skeletal phrase, describing the image, is provided by processing the feature maps with a first LSTM neural network. The first LSTM neural network is trained to determine the skeletal phrase based on the first set of ground truth phrases. The first LSTM analyzes the feature maps for objects and relationships between the objects, and provides skeletal words describing objects in the image data. A combination of skeletal words forms a skeletal phrase.

In block 208, attention maps, associating skeletal words of the skeletal phrase with the locations in the image, are generated. The first LSTM can also provide, based on training, a respective attention for each image feature, and can generate the attention maps. The attention maps are refined after providing the skeletal word describing the image feature based on the skeletal phrase. The attribute words can be provided based on the refined attention maps.

In block 210, an accuracy of a skeletal word in the skeletal phrase is verified. A k-nearest neighbor search is performed on the first set of ground truth images for nearest neighbor objects of an object described by the skeletal word. A similarity of titles of the nearest neighbor objects with the skeletal word is identified. If a measure of the similarity exceeds a fiducial level, then the skeletal word is considered as sufficiently accurate.

In block 212, attribute words describing the image are provided. The attribute words are provided for words in the skeletal phrase by processing the skeletal phrase and the feature maps with a second LSTM neural network.

The attribute words can be provided based on the refined attention maps, the skeletal words, a hidden state of the first LSTM up to the current skeletal word, a weighted last time-step hidden state of the first LSTM neural network, a weighted version of the feature maps, the like, or a combination thereof. The first time-step of the second LSTM thus can have an input as follows:

$$X_{-1}=\sigma(W_1\Sigma\alpha_L \cdot CNN(I_L)+W_e S_{skeleton}+W_h h_{skeleton})$$

where:

$X_{-1}$ is the input to the first time-step LSTM $\sigma$ is a non-linear activation function (e.g., ReLU activation)

$W_1$, $W_e$, and $W_h$ are trainable parameters (i.e., weights)

$\Sigma\alpha_L \cdot CNN(I_L)$ is the weighted CNN feature $\alpha$ is the attention map $S_{skeleton}$ is the current skeleton word $h_{skeleton}$ is the current skeleton LSTM hidden state.

Thus, this combination of inputs enables the second LSTM neural network to focus on the skeletal object, the exact skeletal word to be described with attributes, and skeletal title context, which improves accuracy of the attributes.

The second LSTM neural network is trained to determine the attribute words based on a second set of ground truth phrases which includes words describing attributes in a second set of ground truth images.

A quantity of the attribute words, a quantity of skeletal words, or both can be controlled by decreasing or increasing a probability of an end-of-phrase token. The end-of-phrase token is a token added to the vocabulary with which an LSTM is trained. This technique provides control over the length of the output phrase, without requiring retraining the first LSTM or retraining the second LSTM. Controlling the probability of the end-of-phrase token also enables controlling a quantity of description per object, a quantity of objects described, or both. A provided sentence probability is modified with a length factor as follows:

$$\log(\hat{P}) = \log(P) + \gamma \cdot l$$

where:
$\hat{P}$ is a modified sentence probability
P is a probability of a generated sentence
γ is a length factor to encourage or discourage longer sentences
l is a length of a generated sentence.

Modification can be performed during generating each word rather than after an entire sentence has been provided. This technique works well with a beam search of the feature maps to determine a most-promising object and associated most-likely skeletal word.

In an example, a pool of candidate output phrases is created, where each word in each candidate phrase has a respective probability of being accurate. When the second LSTM reaches the end-of-sentence token, then the candidate phrase having the highest overall probability is chosen as the output phrase.

In block 214, the skeletal phrase and the attribute words are combined to form an output phrase describing the image. The output phrase can be provided to another machine, a user, or both. In an example, the output phrase can be displayed on a display (e.g., a user display).

In an example, the Hierarchical LSTM Technique produces the following evaluation metrics when processing the stock and MS-COCO datasets:

using a coarse-to-fine LSTM architecture which has two LSTMs. The LSTMs can be trained using the techniques described in block 202 of FIG. 2 and the example training process 300 of FIG. 3.

The exemplary technique 400 can be implemented by user device 102A and/or creative apparatus 108, although other devices and configurations can also be implemented. The exemplary technique 400 can be implemented by storing and executing instructions in a non-transitory computer-readable medium. Reference to the technique 400 being performed by a computing device includes the technique 400 being performed by one or more computing devices.

In block 402, feature maps describing image features in locations in an image are created. The feature maps are created by processing the image with a convolutional neural network (CNN) which is trained to extract the image features (e.g., data describing objects) based on pixel values (e.g., color, grayscale value) of pixels within locations of the image. The CNN produces a feature map from the extracted image features. The feature map is input to the first LSTM.

In block 404, a skeletal phrase, describing the image, is provided by processing the feature maps with a first LSTM neural network. The first LSTM neural network is trained to analyze the feature map for objects and relationships between the objects, and provide the skeletal phrase based on the first set of ground truth phrases. The first LSTM analyzes the feature maps for objects and relationships between the objects, and provides skeletal words describing objects in the image data. A beam search of the feature maps can be implemented to determine a most-promising object and associated most-likely skeletal word. A combination of skeletal words forms a skeletal phrase. In a non-limiting example, the skeletal phrase may include "woman holding scale and apple."

In block 406, the entire output phrase as a whole is provided by processing the skeletal phrase and the feature maps with a second LSTM neural network. The second LSTM provides both skeletal words and attributes detailing respective skeletal words. The inputs to the second LSTM include: (1) the feature map, (2) a last-step hidden state of the first LSTM, and (3) the skeletal phrase. These inputs

|  |  | BLEU1 | BLEU2 | BLEU3 | BLEU4 | ROUGEL | METEOR | CIDEr |
| --- | --- | --- | --- | --- | --- | --- | --- | --- |
| Stock Dataset | Hierarchical LSTM | 0.231 | 0.132 | 0.081 | 0.051 | 0.231 | 0.106 | 0.732 |
| | Baseline | 0.215 | 0.125 | 0.078 | 0.049 | 0.223 | 0.103 | 0.757 |
| MS-COCO | Hierarchical LSTM | 0.690 | 0.516 | 0.372 | 0.271 | 0.512 | 0.230 | 0.856 |
| | Baseline | 0.690 | 0.511 | 0.370 | 0.270 | 0.508 | 0.231 | 0.820 |

In an example, the Hierarchical LSTM Technique produces the following SPICE evaluation metrics when processing the stock and MS-COCO datasets:

|  |  | F-Score | Precision | Recall |
| --- | --- | --- | --- | --- |
| Stock Dataset | Hierarchical LSTM | 0.166 | 0.194 | 0.172 |
| | Baseline | 0.157 | 0.186 | 0.157 |
| MS-COCO | Hierarchical LSTM | 0.155 | 0.465 | 0.095 |
| | Baseline | 0.151 | 0.420 | 0.094 |

II. Coarse-to-Fine LSTM Technique

Figure 4:
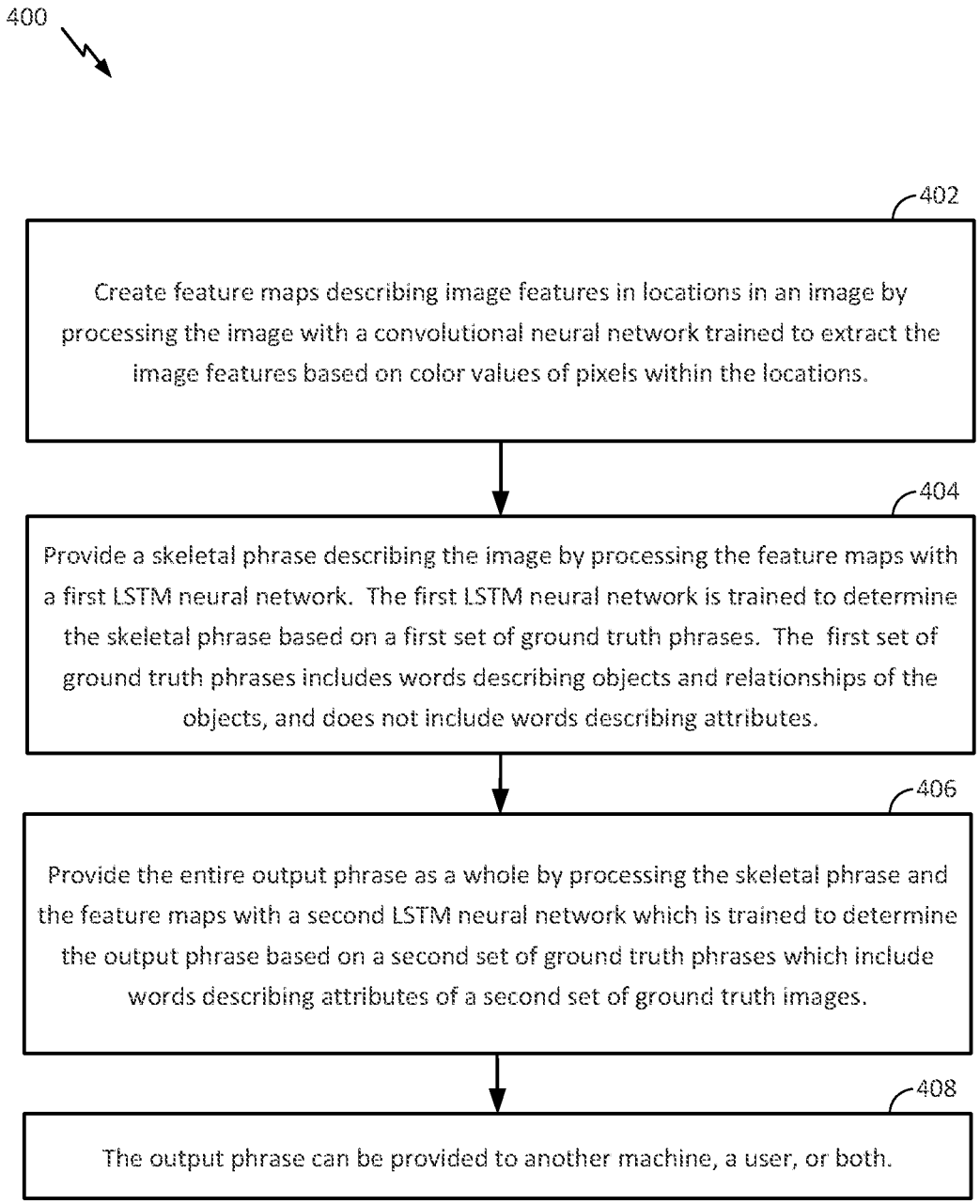
FIG. 4 is a flow chart illustrating an exemplary technique for providing an output phrase describing an image using a coarse-to-fine LSTM architecture.

FIG. 4 is a flow chart illustrating an exemplary technique 400 for providing an output phrase describing an image guide the second LSTM to produce an accurate output phrase. The skeletal phrase serves as a soft constraint to encourage the skeletal phrase to appear in the output phrase. The skeletal phrase has a sequence and each skeletal word is weighted. Initially, the first skeletal word has the highest weight. As the attributes are identified, the weights applied to the skeletal words change, with the highest weight being applied to a skeletal word for which attributes are being determined. This shift in weights causes the second LSTM neural network to shift focus from one highest weighted skeletal word to the next. The first time-step of the second LSTM thus can have an input as follows:

$$X_{-1} = \sigma(W_1 CNN(I) + W_h h_{skeleton\ N})$$

where:
X$_{-1}$ is the first time-step input
σ is a non-linear activation function (e.g., ReLU activation)
W$_1$, and W$_h$ are trainable parameters (i.e., weights)
CNN(I) is the CNN feature
h$_{skeleton\ N}$ is the last time-step skeleton LSTM hidden state.

A skeleton context vector can be added to provide the second LSTM with the soft constraint of including the skeletal title when providing the output phrase. The skeleton context vector can be calculated as follows:

$$C_t = \sum_j \beta_{tj} \cdot W_e S_{skeleton\ j}$$

where:
C$_t$ is the context vector at time-step t
S$_{skeleton\ j}$ is the jth skeletal word
β$_{tj}$ is a weight which can be learned or fixed as follows:

β$_{tj}$=exp(-abs(t-1.5·j))

Thus, it can be assumed that the full length of the output phrase is approximately 1.5 times the skeletal length. Accordingly, the second LSTM can be configured as follows:

$i_t = \sigma(W_{xi}w_t + W_{hi}h_{t-1} + W_{si}C_t + B_i)$ $f_t = \sigma(W_{xf}w_t + W_{hf}h_{t-1} + W_{sf}C_t + B_f)$ $o_t = \sigma(W_{xo}w_t + W_{ho}h_{t-1} + W_{so}C_t + B_o)$ $g_t = \tanh(W_{xc}w_t + W_{hc}h_{t-1} + W_{sc}C_t + B_c)$ where:
i$_t$ is the input gate at time t
f$_t$ is the forget gate at time t
o$_t$ is the output gate at time t
g$_t$ is the input information gate at time t.

The second LSTM neural network is trained to determine the output phrase based on the second set of ground truth phrases which include words describing attributes in a second set of ground truth images. Continuing with the example above, the second LSTM produces an output phrase of "smiling young woman holding a weight scale and a red apple," which includes the skeletal phrase.

In block 408, the output phrase can be provided to another machine, a user, or both. In an example, the output phrase can be displayed on a display (e.g., a user display).

In an example, the Coarse-to-Fine LSTM Technique produces the following evaluation metrics:

|  | BLEU1 | BLEU2 | BLEU3 | BLEU4 | ROUGEL | METEOR | CIDEr |
|---|---|---|---|---|---|---|---|
| Coarse-Fine LSTM | 0.220 | 0.131 | 0.083 | 0.053 | 0.224 | 0.104 | 0.756 |
| Baseline | 0.215 | 0.125 | 0.078 | 0.049 | 0.223 | 0.103 | 0.757 |

III. LSTM with Attention Map Technique

The LSTM with Attention Map Technique implements an LSTM which is configured not only to use an attention map as an input for providing a word, but is also configured to refine the attention map after each word is provided. Frequently refining the attention map during the providing process increasingly aligns the attention map with the specific image being processed. This technique improves accuracy of providing attribute words by focusing the providing on visual elements of the image relative to a global understanding of the image.

The attention map is refined as follows. The LSTM receives an attention map and a feature map from the CNN. Each feature in the feature map can be a D×L×L dimensional high level feature that maintains spatial information of the image. For example, the feature map can be a D-dimensional feature vector in L$^2$ locations. The feature map has L$^2$ feature vectors. The L$^2$ feature vectors are summed and weighted with attention weight a. This weighted sum of the L$^2$ feature vectors is input to the LSTM as an attention guided image feature for each time-step. For this particular time-step (T), the LSTM then produces (and outputs) a word probability list (P$_{attend}$). The word probability list is a list of words and, for each word, a respective probability that the word is accurate.

A word map is updated with the word probability list. The word map is a matrix of provided words. Locations in the word map correspond with locations in the image. Thus, the word map can identify portions of an image having similar provided words which describe similar features.

After the word map is created, a spatial word probability can be used to refine the attention map as follows:

$$\alpha_{post(l)} = P_{attend}^T \cdot P_l$$

where:
α$_{post(l)}$ is the attention in the lth location of the refined attention map after calculating the word map P$_l$
p$_{attend}^T$ is the word probability for time-step T.

After the attention map is refined, the LSTM can determine, using the refined attention map, a subsequent word. Thus, during the process, the attention map is increasingly aligned with the specific image being processed, resulting in improved accuracy of provided words.

IV. Image-To-Text Embedding Technique

Figure 5:
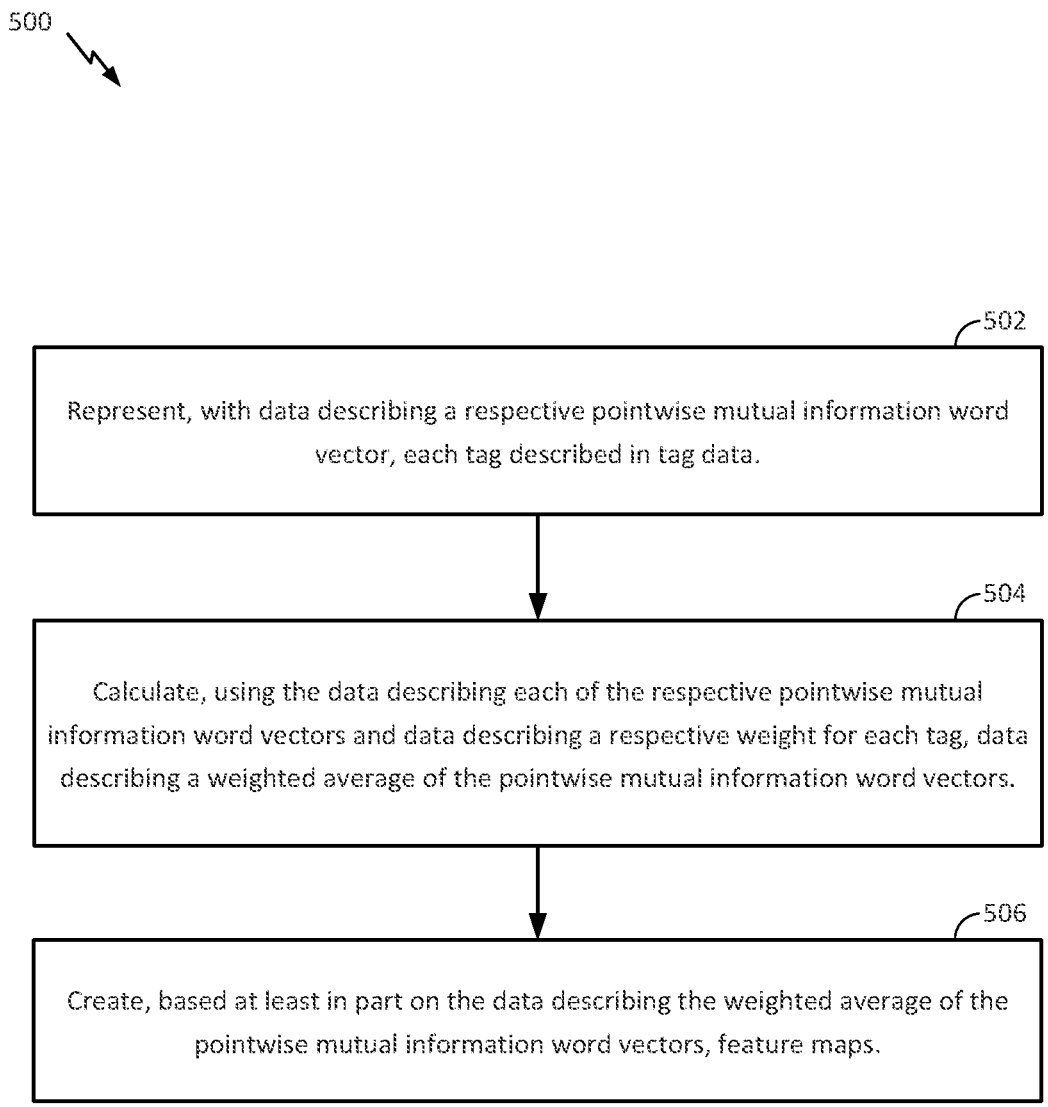
FIG. 5 is a flow chart illustrating an exemplary image-to-text embedding technique for creating a feature map in conjunction with a CNN.

FIG. 5 is a flow chart illustrating an exemplary image-to-text embedding technique 500 for creating a feature map in conjunction with a CNN. Image-to-text embedding produces more accurate feature maps by taking into account image tag data to extract features. This technique enhances CNN performance by causing the CNN to retrieve embedded image text from an image. Image text can include a caption, tag, title, etc., and is known to be reasonably accurate. The CNN then computes high-level features based at least in part on the image text. Implementing this technique increases the accuracy of feature maps and thus increases the accuracy of the output phrase.

In examples, the exemplary technique 500 can be used with the exemplary technique 200 of FIG. 2 and the exemplary technique 400 of FIG. 4. The exemplary technique 500 uses image-to-text embedding to extract image features.

The exemplary technique 500 can be implemented by user device 102A and/or creative apparatus 108, although other devices and configurations can also be implemented. The exemplary technique 500 can be implemented by storing and executing instructions in a non-transitory computer-readable medium. Reference to the technique 500 being performed by a computing device includes the technique 500 being performed by one or more computing devices.

In block 502, each tag described in tag data is represented with data describing a respective pointwise mutual information word vector. The user-provided image tag data can be retrieved from input image data.

In block 504, data describing a weighted average of the pointwise mutual information word vectors is calculated by using the data describing each of the respective pointwise mutual information word vectors and data describing a respective weight for each tag. The weight for each tag can be uniform or can descend with tag order.

In block 506, the CNN creates feature maps based on the weighted average of the pointwise mutual information word vectors. A last time-step image embedding layer of the CNN is trained by minimizing a cosine similarity loss between the weighted average of the pointwise mutual information word vectors and the image embedding layer. This increases a likelihood that the image embedding layer will output a word which is similar to a word in the tag. Then, the feature maps are created. Thus, the exemplary technique 500 improves description accuracy by providing a phrase providing LSTM with a better understanding of the image to describe.

In one example, the techniques disclosed herein can be combined. For example, the Hierarchical LSTM Technique can be combined with the LSTM with Attention Map Technique. Further, the Coarse-to-Fine LSTM Technique can be combined with the LSTM with Attention Map Technique. In another example, the LSTM with Attention Map Technique can be combined with the Image-To-Text Embedding Technique. In another example, the Hierarchical LSTM Technique can be combined with the Image-To-Text Embedding Technique. In another example, the Coarse-to-Fine LSTM Technique can be combined with the Image-To-Text Embedding Technique. These examples are non-limiting.

In an example, the Image-To-Text Embedding Technique produces the following evaluation metrics:

|  | BLEU1 | BLEU2 | BLEU3 | BLEU4 | ROUGEL | METEOR | CIDEr |
| --- | --- | --- | --- | --- | --- | --- | --- |
| Inage-Text | 0.215 | 0.125 | 0.078 | 0.049 | 0.223 | 0.103 | 0.757 |
| CNN Features | 0.203 | 0.118 | 0.074 | 0.047 | 0.211 | 0.096 | 0.681 |

Exemplary Computing Device

Figure 6:
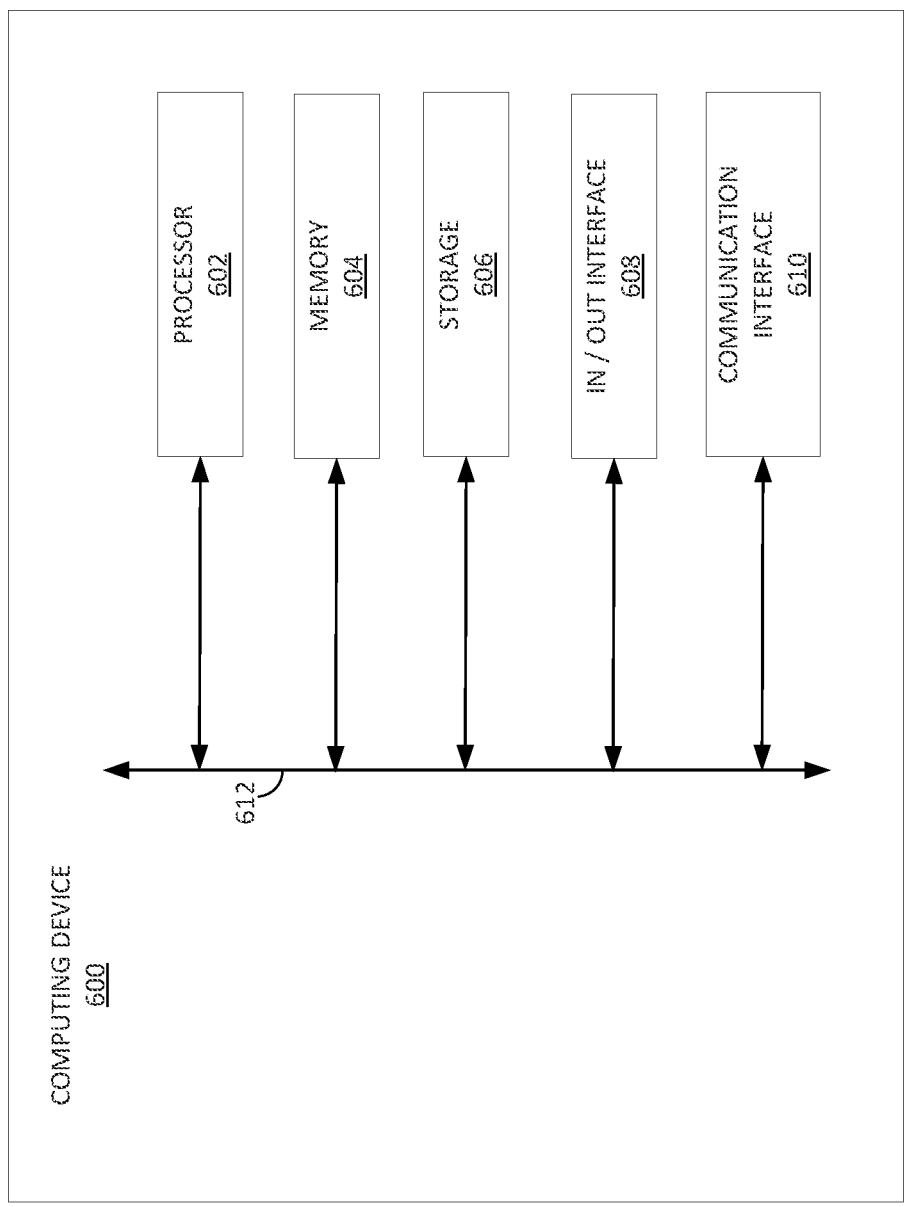
FIG. 6 is a block diagram depicting an example hardware implementation.

Any suitable computing system or group of computing systems can be used to implement the techniques and methods disclosed herein. For example, FIG. 6 is a block diagram depicting examples of implementations of such components. The computing device 600 can include a processor 602 that is communicatively coupled to a memory 604 and that is configured to execute computer-executable program code and/or access information stored in memory 604 or storage 606. The processor 602 can include a microprocessor, an application-specific integrated circuit ("ASIC"), a state machine, another processing device, or a combination thereof. The processor 602 can include one processing device or more than one processing device. The processor 602 can be coupled to a computer-readable medium storing instructions that, when executed by the processor 602, cause the processor 602 to perform at least a portion of an operation described herein. In an example, the processor 602 can include the computer-readable medium storing instructions that, when executed by the processor 602, cause the processor 602 to perform at least a portion of an operation described herein.

The memory 604 and the storage 606 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, any other medium from which a computer processor can read instructions, or a combination thereof. The instructions can include processor-specific instructions generated by a compiler, an interpreter, or both, from code written in any suitable computer-programming language, including, for example, C, C++, C#, R, Visual Basic, Java, Python, Perl, JavaScript, Julia, Scala, ActionScript, or a combination thereof.

The computing device 600 can also include an external device, an internal device, or a combination thereof, such as an input device, an output device, or a combination thereof. For example, the computing device 600 is shown with an input/output ("I/O") interface 608 which can be configured to receive input from an input device, provide output to an output device, or a combination thereof. A communication interface 610 can also be included in the computing device 600 and can include any device or group of devices suitable for establishing a wired or wireless data connection with one or more data networks. Non-limiting examples of the communication interface 610 include an Ethernet network adapter, a modem, the like, or a combination thereof. The computing device 600 can be configured to transmit messages as an electronic signal, an optical signal, or both, via the communication interface 610. A bus 612 can also be included to communicatively couple one or more components of the computing device 600.

The computing device 600 can be configured to execute program code that configures the processor 602 to perform at least a portion of an operation described herein. The program code can include one or more modules. The program code can be resident in the memory 604, storage 606, or any suitable computer-readable medium, and can be executed by the processor 602 or any other suitable processor. In some embodiments, the modules can be resident in the memory 604. In additional or alternative embodiments, one or more of the modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter can be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages can be used to implement the teachings contained herein in software to be used in programming or configuring a computing device.

Embodiments of the methods disclosed herein can be performed in the operation of such computing devices. The order of the blocks presented in the examples above can be varied—for example, blocks can be re-ordered, combined, and/or broken into sub-blocks. In an example, the blocks or processes can be performed in parallel.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values can, in practice, be based on additional conditions or values beyond those recited. Headings, lists, and numbering included herein are for ease of explanation only and are not meant to be limiting.

Within this description, the singular can portend the plural, where practicable. While the present subject matter has been described in detail with respect to specific embodiments thereof, it will be appreciated that those skilled in the art, upon attaining an understanding of the foregoing, can readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to a person having ordinary skill in the art.

What is claimed is:

1. A method comprising:
    processing image features of an image using a first long short-term memory (LSTM) neural network to obtain a first object word and a second object word characterizing the image features;
    processing the image features, the first object word, and the second object word with a second LSTM neural network to obtain a first attribute word and a second attribute word; and
    providing an output phrase describing the image, the output phrase including the first attribute word modifying the first object word, and the second attribute word modifying the second object word, wherein providing the output phrase comprises merging the first object word and the second object word from the first LSTM neural network, and the first attribute word and the second attribute word from the second LSTM neural network, to obtain the output phrase.

2. The method of claim 1, comprising:
    creating feature maps describing the image features in location in the image, wherein the feature maps are created by processing the image with a convolutional neural network (CNN) trained to extract the image features based on color values of pixels within the locations; and
    processing the image features including processing the feature maps with the first LSTM neural network, to obtain the first object word and the second object word.

3. The method of claim 1, wherein the first LSTM neural network is trained to determine the first object word and the second object word using a first set of ground truth images that includes words for objects.

4. The method of claim 3, further comprising training the first LSTM neural network, wherein the training includes:
    parsing, using a natural language parser, original ground truth phrases describing the first set of ground truth images to identify attribute words; and
    creating the first set of ground truth phrases from the original ground truth phrases by removing the attribute words from the original ground truth phrases.

5. The method of claim 1, wherein the second LSTM neural network is trained to determine the first attribute word and the second attribute word using a second set of ground truth images that include words for attributes.

6. The method of claim 1, wherein processing image features of an image using a first LSTM further comprises:
    generating at least one attention map associating the image features with image locations; and
    associating the first object word with a first image feature at a first image location and associating the second object word with a second image feature at a second image location.

7. The method of claim 6, wherein generating the at least one attention map comprises:
    assigning a weighted attention value to each image feature and corresponding image location; and
    selecting the first image feature and the second image feature, and correspondingly, the first object word and the second object word, based on the assigning.

8. The method of claim 6, further comprising
    providing the at least one attention map to the second LSTM neural network; and
    matching the first attribute word to the first object word, and the second attribute value to the second object word, based on the attention map.

9. The method of claim 1, further comprising:
    generating, using the first LSTM neural network and the second LSTM neural network, a pool of candidate phrases, including the output phrase;
    assigning each word in each of the pool of candidate phrases a respective probability of being accurate; and
    selecting the output phrase from among the pool of candidate phrases, based on the assigning.

10. The method of claim 1, wherein providing the output phrase comprises providing the output phrase as a whole from the second LSTM neural network.

11. The method of claim 1, wherein the first LSTM neural network outputs a skeletal phrase including the first object word and the second object word characterizing the image features, wherein the skeletal phrase does not include words describing attributes of the first object word and the second object word, and wherein the second LSTM neural network takes the skeletal phrase as an input.

12. A system for providing an output phrase describing an image, comprising:
   means for creating feature maps describing image features in location in the image, wherein the feature maps are created by processing the image with a convolutional neural network (CNN) trained to extract the image features based on color values of pixels within the locations;
   means for processing the image features of the image using a first long short-term memory (LSTM) neural network to obtain a first object word and a second object word characterizing the image features, wherein processing the image features includes processing the feature maps with the first LSTM neural network;
   means for processing the image features, the first object word, and the second object word with a second LSTM neural network to obtain a first attribute word and a second attribute word; and
   means for providing an output phrase describing the image, the output phrase including the first attribute word modifying the first object word, and the second attribute word modifying the second object word.

13. A non-transitory computer-readable medium storing instructions, which, when executed by at least one computing device, cause the computing device to:
   process image features of an image using a first long short-term memory (LSTM) neural network to obtain a first object word and a second object word characterizing the image features;
   process the image features, the first object word, and the second object word with a second LSTM neural network to obtain a first attribute word and a second attribute word; and
   provide an output phrase describing the image, the output phrase including the first attribute word modifying the first object word, and the second attribute word modifying the second object word, wherein providing the output phrase comprises merging the first object word and the second object word from the first LSTM neural network, and the first attribute word and the second attribute word from the second LSTM neural network, to obtain the output phrase.

14. The non-transitory computer-readable medium of claim 13, wherein the instructions, when executed by the at least one computing device, are further configured to cause the at least one computing device to:
   create feature maps describing the image features in location in the image, wherein the feature maps are created by processing the image with a convolutional neural network (CNN) trained to extract the image features based on color values of pixels within the locations; and
   process the image features including processing the feature maps with the first LSTM neural network, to obtain the first object word and the second object word.

15. The non-transitory computer-readable medium of claim 13, wherein the first LSTM neural network is trained to determine the first object word and the second object word using a first set of ground truth images that includes words for objects.

16. The non-transitory computer-readable medium of claim 13, wherein the second LSTM neural network is trained to determine the first attribute word and the second attribute word using a second set of ground truth images that include words for attributes.

17. The non-transitory computer-readable medium of claim 13, wherein the instructions, when executed by the at least one computing device, are further configured to cause the at least one computing device to process the image features of the image using the first LSTM, including:
   generating at least one attention map associating the image features with image locations; and
   associating the first object word with a first image feature at a first image location and associating the second object word with a second image feature at a second image location.

18. The non-transitory computer-readable medium of claim 17, wherein the instructions, when executed by the at least one computing device, are further configured to cause the at least one computing device to:
   provide the at least one attention map to the second LSTM neural network; and
   match the first attribute word to the first object word, and the second attribute value to the second object word, based on the attention map.

19. The non-transitory computer-readable medium of claim 13, wherein the instructions, when executed by the at least one computing device, are further configured to cause the at least one computing device to:
   generate, using the first LSTM neural network and the second LSTM neural network, a pool of candidate phrases, including the output phrase;
   assign each word in each of the pool of candidate phrases a respective probability of being accurate; and
   select the output phrase from among the pool of candidate phrases, based on the assigning.

* * * * *